United States Patent
Stump et al.

(10) Patent No.: US 11,079,743 B2
(45) Date of Patent: Aug. 3, 2021

(54) PROJECT AUTONOMY IN INDUSTRIAL AUTOMATION DESIGN ENVIRONMENTS

(71) Applicant: Rockwell Automation Technologies, Inc., Mayfield Heights, OH (US)

(72) Inventors: Andrew R. Stump, Mentor, OH (US); Srdjan Josipovic, Montreal (CA); Matthew R. Ericsson, Lyndhurst, OH (US); Michael D. Kalan, Highland Heights, OH (US); Anthony Carrara, Strongsville, OH (US); Christopher W. Como, Chagrin Falls, OH (US); Sharon M. Billi-Duran, Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/144,073

(22) Filed: Sep. 27, 2018

(65) Prior Publication Data
US 2020/0103873 A1 Apr. 2, 2020

(51) Int. Cl.
*G05B 19/418* (2006.01)
*G06F 3/0484* (2013.01)

(52) U.S. Cl.
CPC . *G05B 19/41845* (2013.01); *G05B 19/41815* (2013.01); *G06F 3/0484* (2013.01); *G05B 2219/23258* (2013.01)

(58) Field of Classification Search
CPC ........ G05B 19/41815; G05B 19/41845; G05B 2219/23258; G06F 3/0484
USPC ........................................ 717/120
See application file for complete search history.

(56) References Cited

U.S. PATENT DOCUMENTS

| | | | |
|---|---|---|---|
| 6,874,148 B1* | 3/2005 | Richardson | G06F 9/4486 719/328 |
| 6,931,288 B1 | 8/2005 | Lee et al. | |
| 7,324,856 B1 | 1/2008 | Bromley | |
| 7,809,683 B2 | 10/2010 | Hood et al. | |
| 8,041,435 B2 | 10/2011 | Plache et al. | |

(Continued)

FOREIGN PATENT DOCUMENTS

| | | |
|---|---|---|
| EP | 1284446 A1 | 2/2003 |
| EP | 2595510 A2 | 5/2013 |

OTHER PUBLICATIONS

Eilermann et al., "A general approach to module-based plant design," Elsevier, 2018, 16pg. (Year: 2018).*

(Continued)

*Primary Examiner* — Ryan D. Coyer

(57) ABSTRACT

The present disclosure is directed to systems, methods and devices for maintaining automated process module autonomy across integrated design environments. An indication to render a plurality of software modules for an automated industrial process into a module that is navigable as a singular unit may be received. The plurality of software modules may be rendered as a single module that is navigable as a singular unit. A modification to a first one of the plurality of software modules that affects at least a second one of the plurality of software modules may be received. A request to remove the second one of the plurality of software modules from the single module may be received, and the second one of the plurality of software modules may be removed from the single module.

20 Claims, 8 Drawing Sheets

(56) References Cited

U.S. PATENT DOCUMENTS

| | | |
|---|---|---|
| 9,128,479 B2 | 9/2015 | Reichard et al. |
| 2004/0075689 A1 | 4/2004 | Schleiss et al. |
| 2005/0027376 A1 | 2/2005 | Lucas et al. |
| 2005/0027377 A1 | 2/2005 | Lucas et al. |
| 2005/0222698 A1 | 10/2005 | Eryurek et al. |
| 2006/0195817 A1 | 8/2006 | Moon |
| 2006/0259500 A1 | 11/2006 | Hood et al. |
| 2006/0277027 A1* | 12/2006 | Mann ............... G06F 8/20 703/25 |
| 2006/0277498 A1* | 12/2006 | Mann ............ G06F 3/0481 715/825 |
| 2007/0132779 A1 | 6/2007 | Gilbert et al. |
| 2008/0127092 A1 | 5/2008 | Tomar |
| 2010/0083232 A1 | 4/2010 | Chouinard |
| 2012/0029661 A1 | 2/2012 | Jones et al. |
| 2013/0123948 A1* | 5/2013 | Reid ............... G05B 19/054 700/20 |
| 2014/0129550 A1 | 5/2014 | Weatherhead et al. |
| 2014/0129822 A1 | 5/2014 | Weatherhead et al. |
| 2014/0130012 A1 | 5/2014 | Weatherhead et al. |
| 2015/0338838 A1 | 11/2015 | McKelvey et al. |
| 2015/0363543 A1* | 12/2015 | Mansouri ........ G06F 16/3331 703/7 |
| 2016/0109875 A1 | 4/2016 | Majewski et al. |
| 2017/0185594 A1 | 6/2017 | Schulz et al. |
| 2018/0046339 A1 | 2/2018 | Naidoo et al. |
| 2018/0113430 A1* | 4/2018 | Naidoo ............... G05B 19/05 |
| 2019/0049928 A1 | 2/2019 | Naidoo et al. |
| 2019/0056719 A1 | 2/2019 | Ong et al. |

OTHER PUBLICATIONS

Borland: "Borland C++ User's Guide", Borland C++ User's Guide, Oct. 31, 1993, pp. 1-462, XP055627917, USA, http://www.bitsavers.org/pdf/borland/borland_C++_Version_4.0_Users_Guide_Oct93.pdf.

European Search Report: "EP124776_EESR", dated Feb. 20, 2020, pp. 1-14, Munich, Germany.

European Search Report, Ref. EP124781-AN for European Appl. No. 19199778.2-1224 dated Feb. 20, 2020 Munich, DE, dated Mar. 27, 2020, 10 pages.

Final Office Action for U.S. Appl. No. 16/144,105, dated Jun. 15, 2020, 64 pages.

European Search Report, dated Jun. 5, 2020, pp. 1-13, Munich, Germany.

"Non-Final Office Action", U.S. Appl. No. 16/144,171, dated Jun. 8, 2020, pp. 1-43, United States Patent and Trademark Office, Alexandria, Virginia.

Notice of Allowance issued in U.S. Appl. No. 16/144,105 dated May 18, 2021, 28 pages.

\* cited by examiner

PROJECT AUTONOMY IN INDUSTRIAL AUTOMATION DESIGN ENVIRONMENTS

BACKGROUND

The physical components of industrial automation processes are typically built by integrating skids of various types, from various vendors. For example, a first vendor might supply a first skid for a set of hardware components for performing a first set of operations, a second vendor might supply a second skid for a set of hardware components for performing a second set of operations, and a third vendor might supply a third skid for a set of hardware components for performing a third set of operations. Each of those skids and their corresponding operations may be integrated into a single modular process skid framework for an industrial automation process. When skids are integrated with one another for performing a single industrial automation process, the software for controlling the individual skids may be maintained or otherwise implemented in individual automation control device files that are viewable only at the individual skid level. In some cases, individual automation control device files encompassing the totality of an industrial automation process may be custom created; however, creating such files requires a great deal of time and labor, and once created, it is difficult to modify portions of the file relating to individual pieces of an automated process (e.g., a single skid) while maintaining the integrity of the rest of the file (e.g., maintaining the integrity of the logic related to the rest of the skids/hardware parts).

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential feature of the claimed subject matter, nor is it intended to be used as an aid in determining the scope of the claimed subject matter.

Non-limiting examples of the present disclosure describe systems, methods, and devices for maintaining automated process module autonomy across integrated design environments. Aspects described herein provide mechanisms for rendering separate software modules corresponding to logic for hardware component blocks (e.g., skids) for industrial automation processes into single navigable units. In this manner, large industrial processes that are built on skids from multiple vendors/manufacturers can be viewably combined in their control logic for the ultimate downstream user. Additional aspects of the disclosure provide mechanisms for pulling individual industrial automation software modules out of a collaboratively rendered group of industrial automation software modules. The individual software modules may be analyzed and modified by the vendor/manufacturer of the corresponding hardware components, ensuring that an entity that most efficiently performs updates and debugging tasks related to the hardware components ultimately performs those tasks. Alternatively, if the downstream user makes modifications to a single software module that has been pulled out from a collaboratively rendered group of software modules, the remaining software modules may maintain their integrity/autonomy regardless of the modifications made to the software module that has been pulled out from the group.

DETAILED DESCRIPTION

Figure 1:
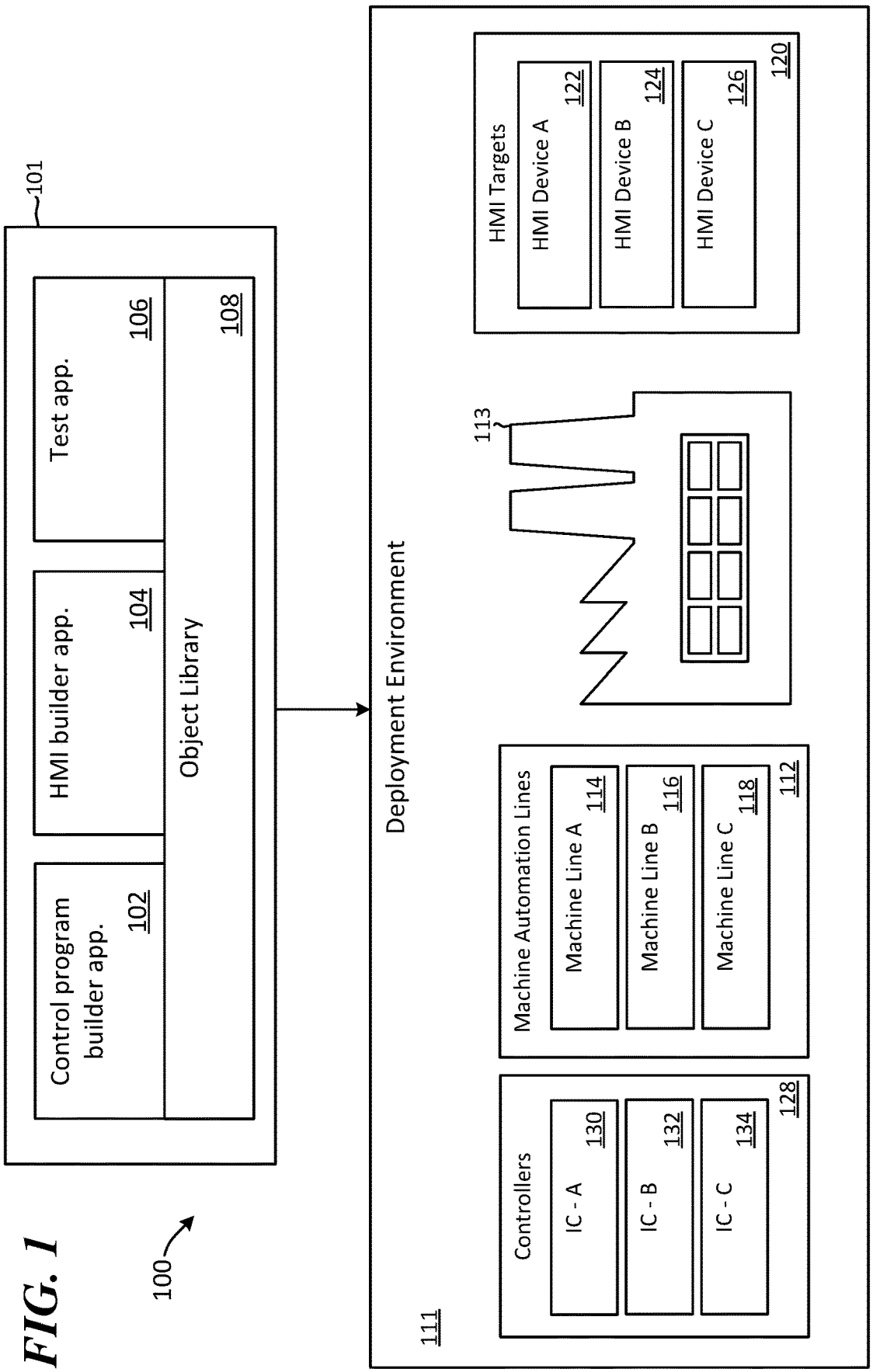
FIG. 1 is a schematic diagram of an exemplary distributed computing environment for assisting with maintaining automated process module autonomy across integrated design environments for industrial automation processes.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Aspects of the present disclosure are directed to systems, methods and devices for maintain automated process module autonomy across integrated design environments. As used herein, a "skid" comprises a plurality of hardware parts integrated as a single unit capable of performing one or more associated operations related to an industrial automation process. A plurality of skids and/or hardware components may be integrated with one another to perform each of the operations of a routine in an automated industrial process. A plurality of skid vendors may provide an entity that wishes to setup a new industrial automation process with skids corresponding to the operations that are necessitated by the desired processes and/or routines.

According to examples described herein, when each skid vendor provides their skid hardware to the entity setting up the automated industrial process, the skid vendor may also provide the entity with a software module for each corresponding skid. The software module for a given skid may comprise one or more automation control device files that are executable by one or more industrial controllers for causing a given skid's hardware components to perform operations associated with one or more routines of a desired automated industrial process.

According to examples, when the entity setting up an automated industrial process integrates software modules for each of a plurality of skids, a rendering component may render the combination of those software modules as a singular navigable unit. For example, rather than generating renderings of individual ladder logic modules for each skid for a particular routine, a single ladder logic module encompassing each of the software modules for the skids that are part of the routine may be generated and rendered according to the mechanisms described herein. The entity grouping the skids together to perform an automated process may want to modify logic corresponding to one or more skids. Software modules corresponding to the skids that the entity would like to make modifications to can be pulled out from the collaboratively rendered software modules, the modifications can be made to the desired skid modules, and the remaining software modules can therefor maintain their autonomy during the modification process. Once the modifications have been completed, the software modules can be once again rejoined into a single navigable unit.

FIG. 1 is a schematic diagram of an exemplary distributed computing environment 100 for assisting with maintaining automated process module autonomy across integrated design environments for industrial automation processes. Computing environment 100 includes automated industrial process software build sub-environment 101, machine automation lines sub-environment 112, HMI targets sub-environment 120, and controllers sub-environment 128. Any and all of the computing devices with regard to the various distributed computing environments described herein may communicate with one another via one or more wired or wireless networks. In some examples, controller sub-environment 128, machine automation lines sub-environment 112, and/or HMI targets sub-environment 120, may be deployed together in an industrial automation process factory setting, such as in factory 113 in deployment environment 111.

Automated industrial process software build sub-environment 101 includes control program builder application 102, HMI builder application 104, and test application 106, although other industrial automation applications are contemplated. Automated industrial process software build sub-environment 101 also includes object library 108, which comprises a plurality of automated software objects that one or more of the applications in industrial process software build sub-environment 101 may share and/or access. In some examples, object library 108 may be stored locally on one or more computing devices associated with any of control program builder application 102, HMI builder application 104 and/or test application 106. In other examples, object library 108 may be located remotely (e.g., in cloud storage), and one or more computing devices executing control program builder application 102, HMI builder application 104, and/or test application 106, may access object library 108 via a wired or wireless network.

Control program builder application 102 comprises an application for building industrial automation software modules (e.g., single automation control device files, multiple automation control device files) for execution by one or more industrial controllers (e.g., industrial controller—A 130, industrial controller—B 132, industrial controller—C 134) in the performance of routines of an automated industrial process. In some examples, the industrial automation software modules that may be built using control program builder application 102 may comprise ladder logic, function block diagram, sequential function chart, structured text, instruction list, C, and C++, among other software forms.

A ladder logic software module may comprise one or more ladder logic statements, referred to as rungs or instructions. The ladder logic statements define relationships between an output variable and one or more input variables. Input variables are variables that correspond to signals at input terminals and output variables are variables that correspond to signals at output terminals. In relay ladder logic, the input and output signals may be represented graphically as contact symbols and coil symbols arranged in a series of rungs spanning a pair of vertical power rails. A typical ladder logic statement may indicate that a specific output variable is "on" if and only if a first and second input is "on". The ladder logic software module, executed by one or more industrial controllers, manipulates single-bit input and output data representing the state of sensing and operating devices, such as devices machine automation lines sub-environment 112 (e.g., machine line A 114, machine line B 116, machine line C 118) in a factory setting. The ladder logic software module, executed by the one or more industrial controllers, also performs arithmetic operations, timing and counting functions and more complex processing operations. As noted above, however; a controller logic may be created in other software languages, and at its core, the logic functions by taking in inputs from field devices, performing calculations and operations on those inputs, and writing outputs for controlling the field devices based on the calculations.

HMI builder application 104 is an application for building industrial automation software modules (e.g., single HMI configuration files, multiple HMI configuration files) for execution on HMI devices in HMI targets sub-environment 120, which may include typical HMI devices such as dedicated HMI panels, as well as deployment of automation visualization interfaces on computing devices such as smart phones and tablets. An HMI typically receives, via one or more controllers, and processes the status data from devices performing various routines in an industrial automation process (e.g., devices in machine automation lines sub-environment 112, which are deployed in factory 113). An HMI processes, utilizing one or more industrial automation software modules built in HMI builder application sub-environment 104, the status data to generate various graphical displays, which may indicate the current and historical performance of the machines. For example, an HMI graphical display might indicate status metrics of a drive, the pressure of a pump, the speed of a motor, or the output of a robot, each of which may be performing operations that are part of a routine executed in machine automation lines sub-environment 112, controlled from one or more industrial controllers in controllers sub-environment 128.

Test application 106 may perform one or more operations associated with loading industrial automation software modules into virtualized industrial controllers and running one or more industrial automation routines encoded as instructions in the software modules on the virtualized industrial controllers. Test application 106 may utilize the properties of various objects from object library 108 employed in the execution of one or more routines to determine whether new industrial automation software controller modules created in control program builder application 102 perform as desired. Test application 106 may also utilize the properties of various objects from object library 108 employed in the execution of one or more routines to determine whether new industrial automation software HMI modules created in HMI builder application 104 perform as desired. If bugs or unintended issues arise in the testing of one or more routines, test application 106 may identify an object and or software module associated with the problem and flag it for review.

The industrial controllers in controllers sub-environment 128 (industrial controller—A 130, industrial controller—B 132, and industrial controller—C 134) are special purpose computers used for controlling factory devices performing one or more routines in machine automation lines sub-environment 112. Under the direction of one or more industrial automation software modules (e.g., industrial automation software modules built by control program builder application 102), a processor of an industrial controller examines a series of inputs reflecting the status of a controller process or device and changes outputs affecting control of the controlled process or device. The industrial controllers in controllers sub-environment 128 may be constructed in modular fashion to accommodate different application types requiring different numbers and types of input/output (I/O) circuits as is determined by the particular device or process being controlled.

Industrial automation software modules may be delivered to the industrial controllers in source format, token format, object code or executable code. These modules can bind to and use hardware, firmware and/or operating system resources of the industrial controllers. Loadable libraries may be provided to the industrial controllers during runtime to extend functionality and/or provide desired fixes. The stored industrial automation software modules run in real-time or near real-time to provide outputs to the control processes as electrical signals to outputs such as actuators and the like. The outputs are based on the logic of an industrial automation software module and inputs received from sensors of a controlled process being performed in machine automation lines sub-environment 112 in a factory such as in factory 113. One or more industrial controllers may be involved in the performance of routines in machine automation lines sub-environment 112, and the industrial controllers involved in those routines may communicate with the various devices performing those routines via local connections, such as by ethernet, or over a wireless network.

One or more of the industrial controllers in controllers sub-environment 128 may comprise programmable logic controllers (PLCs), which execute a series of operations that are performed sequentially and repeatedly. In general, the series of operations includes an input scan, a program/module scan and an output scan. During the input scan the PLC examines the on or off state of the external inputs and saves these states temporarily in memory. During the program/module scan the PLC scans the instruction of the program/module and uses the input status to determine if an output will be energized. The output results are then saved to memory. During the output scan the controller will energize or de-energize the outputs based on the output results stored in memory to control the external devices.

The computing devices in computing environment 100 utilize object-oriented programming techniques. Additionally, the various sub-environments in computing environment 100 may utilize shared object programming techniques whereby objects in object library 108, and the objects' properties, are shared amongst software modules (e.g., HMI software modules in HMI targets sub-environment 120, controller software modules in controllers sub-environment 128). Object oriented programming shifts the emphasis of software development away from function decomposition and towards the recognition of units of software called "objects" which encapsulate both data and functions. Object oriented programming objects are software entities comprising data structures and operations on data. Together, these elements enable objects to model virtually any real-world entity in terms of its characteristics, represented by its data elements, and its behaviors represented by its data manipulation functions. In this way, objects can model concrete things like physical components of automated industrial processes (e.g., pumps, belts, filters, tanks, computers), and they can model abstract concepts like numbers or geometrical concepts (e.g., flow rate values, tank volumes, connection types).

Each object in object library 108 may comprise a set of data (e.g., attributes) and a set of operations (e.g., methods), that can operate on the data. Each object in object library 108 may additionally or alternatively comprise a set of renderings that can display a set of data, self-describing documentation, one or more graphs that trace object data, and/or a set of configurations that provide alarms related to the data. Methods in an object are invoked by passing a message to the object. The message specifies a method name and an argument list. When the object receives the message, code associated with the named method is executed with the formal parameters of the method bound to the corresponding values in the argument list. Methods and message passing in object oriented programming are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object in object library 108 represents a class of some control element. A class includes a set of data attributes plus a set of allowable operations (e.g., methods) on the data attributes. Object oriented programming supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization. One or more objects in object library 108 may comprise complex objects built from multiple instances of similar objects. Systems, methods and devices described herein may employ abstract object classes, which are designs of sets of objects that collaborate to carry out a set of responsibilities. Frameworks are essentially groups of interconnected objects and classes that provide a prefabricated structure for a working application. Additional description related to the objects and their implementation in the current invention is provided in relation to FIG. 2.

Figure 2:
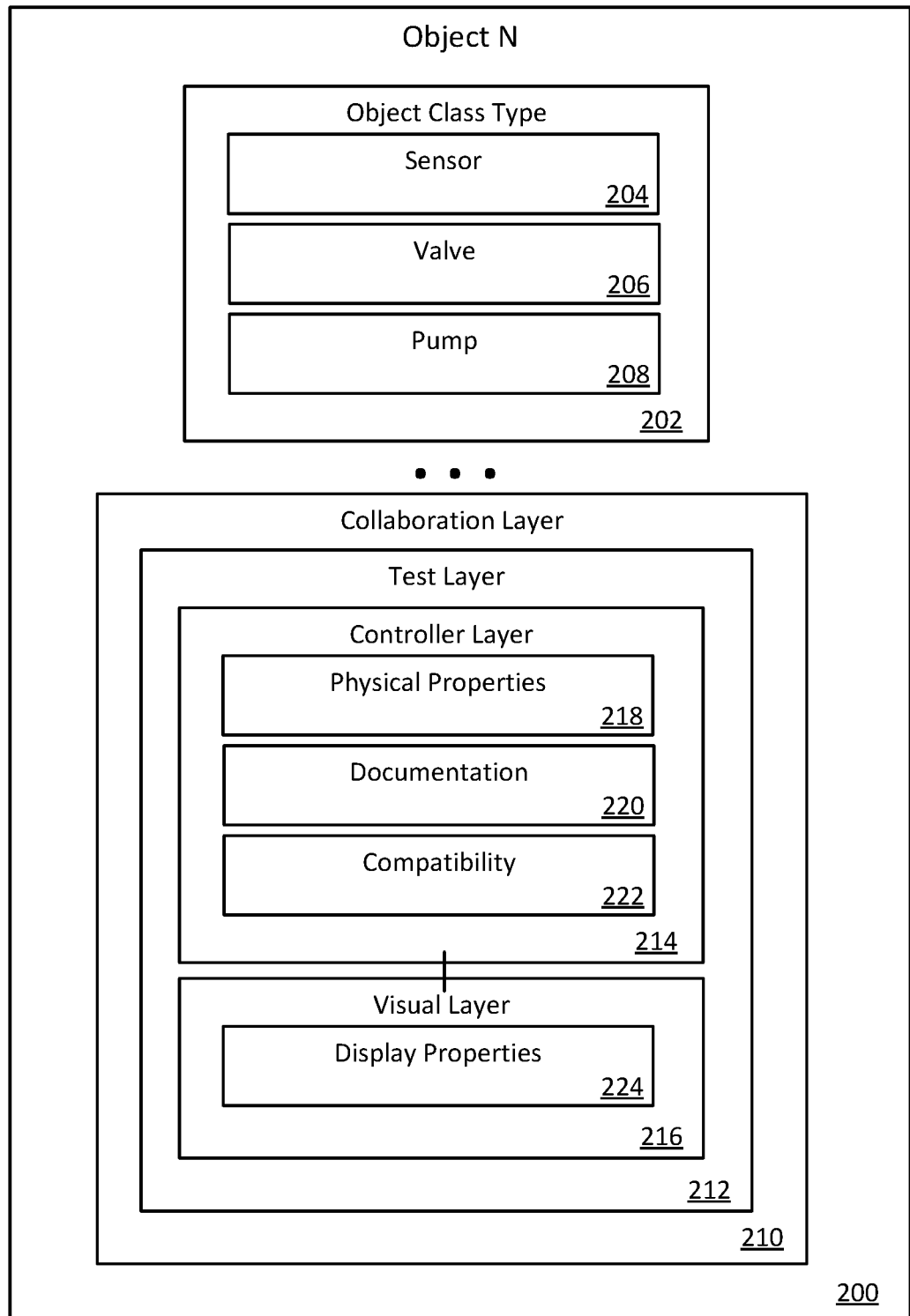
FIG. 2 is a simplified block diagram of an exemplary automation software object and its various components, which may be utilized in the control and visualization of industrial automation processes.

FIG. 2 is a simplified block diagram of an exemplary automation software object 200 and its various components, which may be utilized in the control and visualization of industrial automation processes and routines. Object 200 is an automation software object that may be included as part of a software object library, such as object library 108. In some examples, object 200 may be incorporated in controller software modules for execution by one or more industrial controllers for controlling operations associated with automated industrial processes and routines, and/or virtualized industrial controllers for virtually controlling operations associated with automated industrial processes and routines. In additional examples, object 200 may be incorporated in HMI software modules for execution by one or more HMIs for generating various graphical displays, which may indicate the current and historical performance of the machines associated with automated industrial processes and routines. In additional examples, object 200 may be incorporated in both HMI software modules and controller software modules.

Object 200 comprises a class type 202. While various class types are possible for assignment to object 200, for exemplary purposes, object 200 is indicated as having one of a sensor class type 204, a valve class type 206, or a pump class type 208 assigned to it. The class types depicted in the object class type 202 element each correspond to a common hardware type in industrial automation processes, and they are provided for exemplary purposes; however, users may also create their own class types, which may correspond to combinations of product types and/or product skids (e.g., combinations of devices for performing various automation routines). Additionally, although broad class types are shown for ease of example, each class type may have sub-class types as well (e.g., specific types of sensors, valves, pumps, controllers, displays, etc.), for which more exact specifications may be associated with object 200.

Object 200 also includes collaboration layer 210, test layer 212, controller layer 214, and visual layer 216. Controller layer 214 comprises a plurality of properties and property types, including physical properties 218, documentation properties 220, and compatibility property type 222. In some examples, controller layer 214 may also comprise controller code and/or properties.

Documentation properties 220 may include information about the specific object type specified in object class type 202. For example, if object 200 is a specific brand and type of valve, documentation properties 220 may specify the name of the manufacturer of the valve, actions that may be performed by the valve, operating pressures that the valve can withstand, operating temperatures that the valve can withstand, flow rate, etc. If object 200 is a specific brand and type of temperature sensor, documentation properties 220 may specify the name of the manufacturer of the sensor, temperature range of the sensor, accuracy range of the sensor, scan frequency of the sensor, etc. If object 200 is a specific brand and type of pump, documentation properties 220 may specify the name of the manufacturer of the pump, maximum discharge flow for the pump, maximum discharge pressure for the pump, operating temperatures that the pump can withstand, horsepower for the pump, etc.

Compatibility properties 222 may also include information about the specific object type specified in object class type 202. For example, if object 200 is a specific brand and type of valve, compatibility properties 222 may specify types of service the valve is intended to handle (e.g., air, gas, liquid, vacuum), connection types, etc. If object 200 is a specific brand and type of temperature sensor, compatibility properties 222 may specify types of environments it is intended to handle (e.g., air, gas, liquid, vacuum), connection types, etc. If object 200 is a specific brand and type of pump, compatibility properties 222 may specify types of service the pump is intended to handle (e.g., types of fluid), connection types, etc.

Physical properties 218 include the physical specifications (e.g., size, geometry, mass, material etc.) of object 200.

Visual layer 216 includes display properties, which in association with one or more physical properties 218, documentation properties 220, and/or compatibility properties 222, may be utilized to accurately generate display components in real-time corresponding to components operating in an industrial automation routine. For example, display properties 224 may include various color properties for types of liquid and gas in an industrial automation routine, and when data from pumps, sensors and tanks from the routine are processed by the HMI and/or an industrial controller, those physical properties may be translated with the appropriate color types for the liquid and/or gas involved in the routine for graphically displaying the current state of the routine.

Controller layer 214 comprises a plurality of industrial controller-oriented operations/methods that may be performed by an industrial controller utilizing one or more properties of object 200, such as physical properties 218, documentation properties 220, compatibility properties 222, and/or display properties 224 (in association with visual layer 216). The operations performed by the industrial controller utilizing instructions associated with controller layer 214 direct hardware components of industrial automation processes to perform actions associated with ladder logic routines via various I/O communications as more fully described above.

Test layer 212 comprises a plurality of industrial controller-oriented operations/methods that may be performed by a virtual industrial controller utilizing one or more properties of object 200. The test layer may be associated with the performance of test script operations on object 200 that a typical industrial controller would be expected to perform, while flagging failed operations or operations that lead to unexpected results. Test layer 212 may also include a plurality of HMI-oriented operations/methods that may be performed by an HMI or virtualized HMI utilizing one or more properties of object 200, including display properties 224, physical properties 218, documentation properties 220, and/or compatibility properties 222.

Collaboration layer 210 comprises a plurality of operations/methods that may be performed on one or more properties of object 200. The collaboration operations/methods permit multi-user access to a control project, including centralized control, message coding from one user to another, collaborative development of industrial automation projects, such as collaborative development of application code for an industrial controller or design of an industrial automation process system. According to some examples, operations associated with collaboration layer 210 may provide mechanisms for users to leave notes for one another in association with objects and/or industrial automation projects that objects are included in. In additional examples, the operations associated with collaboration layer 210 may provide mechanisms for users to flag issues associated with development of industrial automation projects. In some examples, the operations associated with collaboration layer 210 may provide for cross-domain collaboration (e.g., a first user may leave a note related to an object while working with the object in HMI code and the note may be surfaced to a second user in relation to the same object in controller code that the second user is working on). In other examples, the operations associated with collaboration layer 210 may provide for same-domain collaboration (e.g., a first user may leave a note related to an object in a first area and/or routine of controller code and the note may be surfaced to a second user in relation to the same object in a second area and/or routine of controller code that the second user is working on).

Figure 3A:
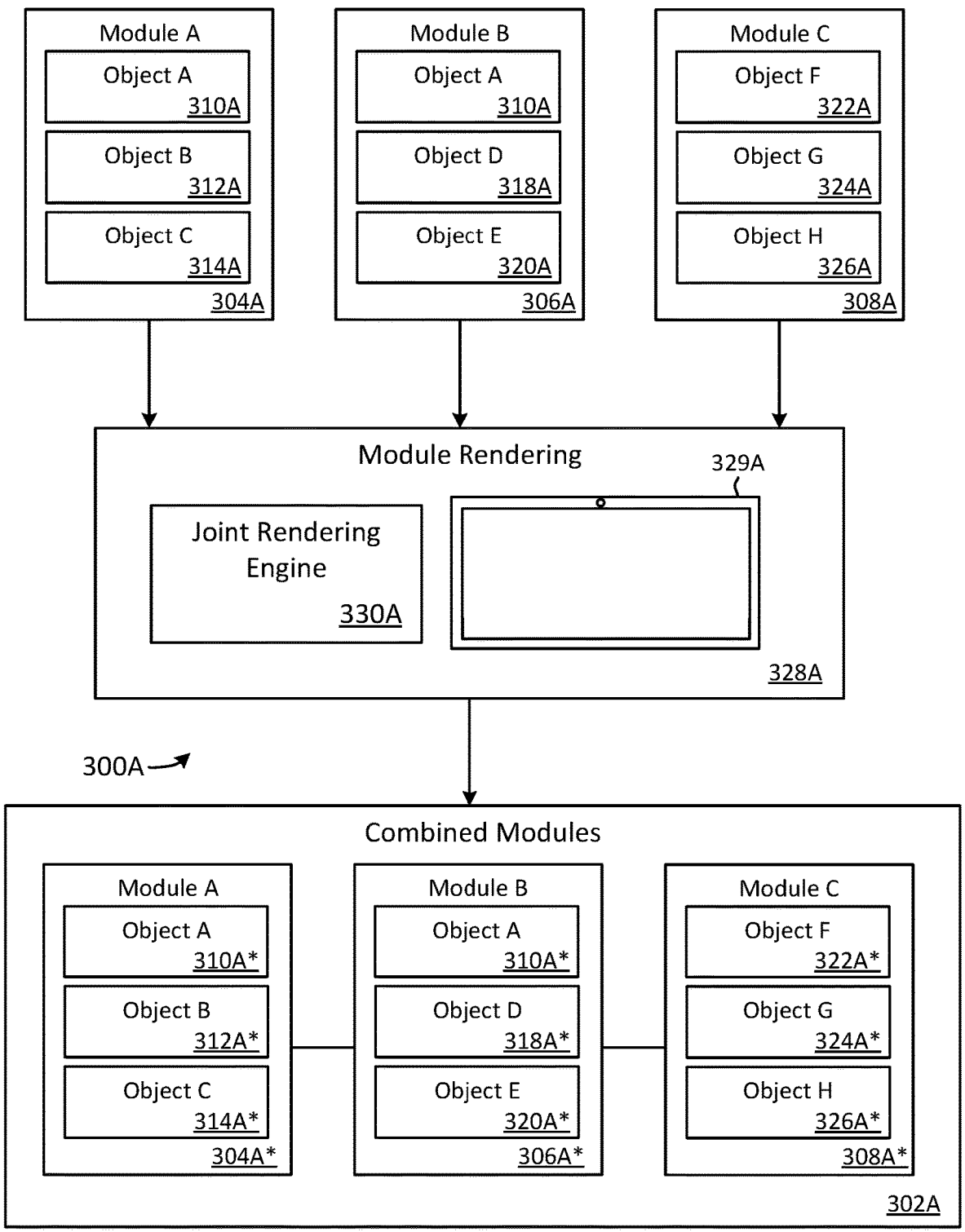
FIG. 3A is a simplified block diagram of an exemplary environment for rendering a plurality of individual software modules as a single navigable unit.

FIG. 3A is a simplified block diagram of an exemplary environment 300A for rendering a plurality of individual software modules as a single navigable unit. Environment 300A includes industrial controller software module A 304A, which comprises object A 310A, object B 312A, and object C 314A; industrial controller software module B 306A, which comprises object A 310A, object D 318A, and object E 320A; and industrial controller software module 308A, which comprises object F 322A, object G 324A, and object H 326A. Environment 300A also includes module rendering sub-environment 328A, and combined modules sub-environment 302A.

Each of industrial controller modules 304A, 306A and 308A may comprise unique logic for a specific set of interconnected devices in an industrial automation routine. That is, in some examples, industrial controller modules 304A, 306A and 308A may each comprise controller logic for different skids utilized in an industrial automation process. In other examples, industrial controller modules 304A, 306A and 308A may each comprise controller logic for different hardware components that do not necessarily need to belong to a skid. In additional examples, 304A, 306A, and 308A may comprise controller logic for different routines of an industrial automation process.

Each of object A 310A through object H 326A may represent a device or other hardware component of the routines that its corresponding controller software module contains logic for. As an example, each of objects A 310A through H 326A may represent a specific object of a class type such as a specific pump type, a specific sensor type, a specific valve type, a specific tank type, and the like. In other examples, each of objects A 310A through object H 326A may represent a set of objects of a class type, such as a set of pumps of a specific type, a set of sensors of a specific type, a set of valves of a specific type, a set of tanks of a specific type, etc.

Industrial controller software module A 304A, industrial controller software module B 306A and industrial controller software module C 308A are independent entities, which are initially rendered and navigable as independent units. For example, if module A 304A comprises software logic for a first skid, that logic is navigable as a single entity, and modifications to that module would not affect module B 306A or module C 308A. Likewise, if module B 304B comprises software logic for a second skid, that logic is navigable as a single entity, and modification to that module would not affect module A 304A or module C 308A. Similarly, if module C 308A comprises software logic for a third skid, that logic is navigable as a single entity, and modification to that module would not affect module A 304A or module C 306A.

Module rendering sub-environment 328A includes computing device 329A, which may comprise a personal computer and/or a server computing device on which joint rendering software engine 330A operates. Joint rendering software engine 330A may perform one or more operations associated with rendering a plurality of software modules corresponding to hardware components of an automated routine/process as a singular navigable unit. For example, when a plurality of software modules, such as industrial controller software modules A through C are received by computing device 329A, joint rendering software engine 330A may render each of those software modules as a single unit such that controller logic for those three software modules can be viewed and/or edited as a single unit. Similarly, rather than feeding three individual modules to an industrial controller when an automated process is to be performed by those modules, a single rendered file may be sent to the industrial controller. In some examples, the single rendered file and/or joint module may be sent to a plurality industrial controllers to, for example, balance the processing load on an industrial automation system.

Joint rendering engine 330A, executing on computing device 329A, receives each of industrial controller software module 304A, industrial controller software module 306A, and industrial controller software module 308, and renders those three modules as a single combined module in combined modules sub-environment 302A. As such, the rendered combination of those modules, and the controller logic represented by those modules, is navigable and modifiable as a single unit. If modifications are to be made to one or more of the software modules, the rendered combination of software modules may be split into individual modules once more for modification, as described below in relation to FIG. 3B.

Figure 3B:
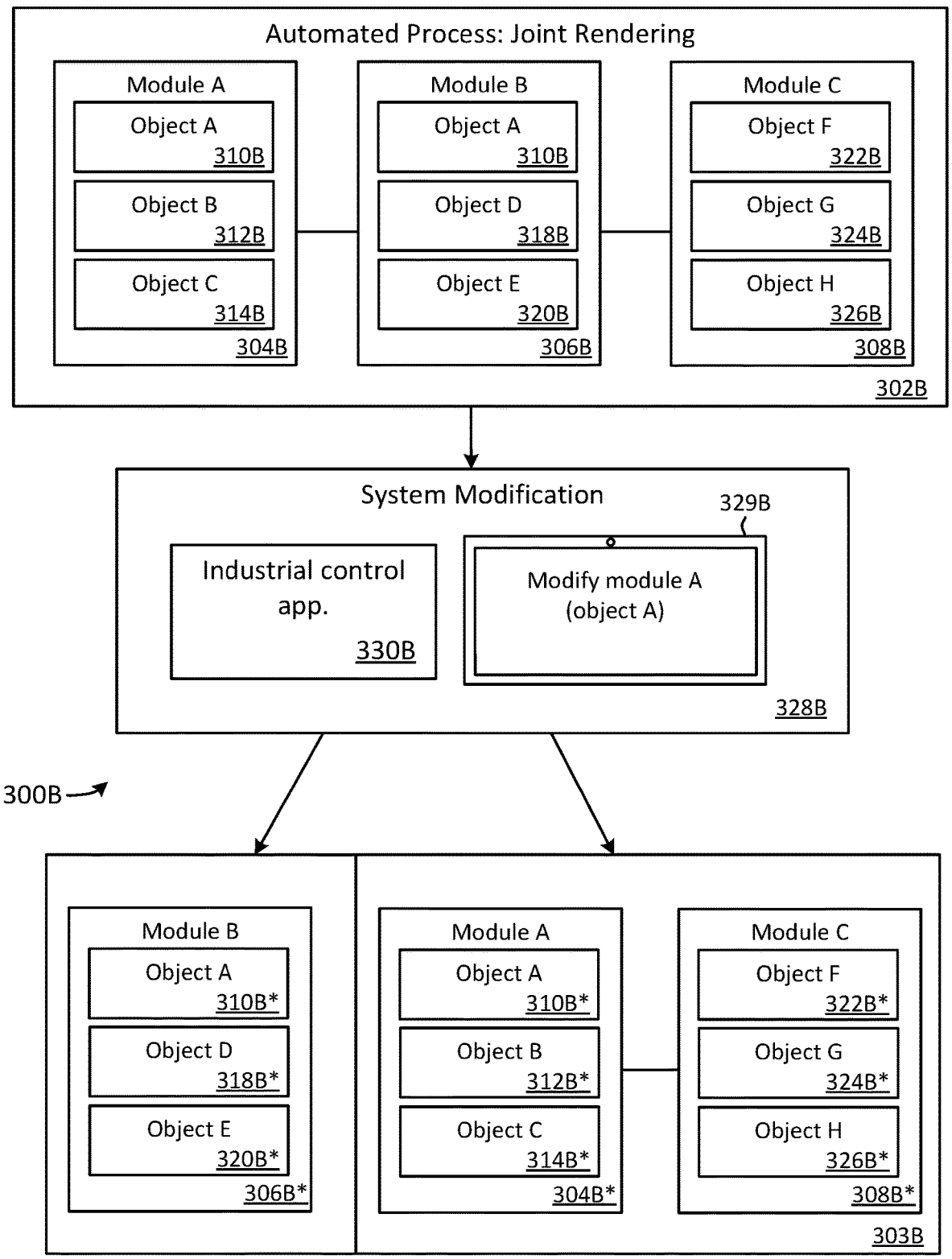
FIG. 3B is a simplified block diagram of an exemplary environment for maintaining automated module autonomy across integrated design environments via integrated rendering of individual module software components.

FIG. 3B is a simplified block diagram of an exemplary environment 300B for maintaining automated module autonomy across integrated design environments via integrated rendering of individual module software components. Environment 300B includes joint software module rendering sub-environment 302B, module modification sub-environment 328B, and split software module sub-environment 303B.

Joint software module rendering sub-environment 302B includes industrial controller software module A 304B, which comprises object A 310B, object B 312B and object C 314B; industrial controller software module B 306B, which comprises object A 310B, object D 318B and object E 320B; and industrial controller software module C 308B, which comprises object F 322B, object G 324B and object H 326B. Each of industrial controller modules 304B, 306B and 308B comprise logic for one or more routines of an industrial automation process (e.g., ladder logic). According to some aspects, each of industrial controller modules 304B, 306B and 308B may comprise unique logic for a specific set of interconnected devices in an industrial automation routine. That is, in some examples, industrial controller modules 304B, 306B and 308B may each comprise controller logic for different skids utilized in an industrial automation process. In other examples, industrial controller modules 304B, 306B and 308B may each comprise controller logic for different hardware components utilized in an industrial automation process, although those hardware components do not necessarily need to belong to a skid. In additional examples, industrial controller modules 304B, 306B and 308B may comprise controller logic for different routines of an industrial automation process.

Each of object A 310B through object H 326B may represent a device or other hardware component of one of the routines that its corresponding controller software module contains logic for. As an example, each of objects A 310B through object H 326B may represent a specific object of a class type such as a specific pump type, a specific sensor type, a specific valve type, a specific tank type, and the like. In other examples, each of objects A 310B through object H 326B may represent a set of objects of a class type, such as a set of pumps of a specific type, a set of sensors of specific type, a set of valves of a specific type, a set of tanks of a specific type, etc.

In joint software rendering sub-environment 302B, industrial controller modules 304B, 306B and 308B are rendered as an integrated set of modules. That is, industrial controller modules 304B, 306B and 308B, and the one or more operations, routines and corresponding devices that they represent, can be rendered by a computer program/application as a single integrated unit. For example, if industrial controller module 304B represents a first skid utilized in performing a routine, industrial controller module 306B represents a second skid utilized in performing the routine, and industrial controller module 308B represents a third skid utilized in performing the routine, a logic application, such as industrial control application 330 and/or test application 106 in FIG. 1, may render those skids and/or logic operations corresponding to those skids for the routine as a single integrated unit that can be viewed, edited, executed and/or tested. In examples where a plurality of controllers each handle processing control of a portion of the single integrated unit, if one controller fails, one or more other controllers of the plurality may provide redundancy and take over processing of the failed controller's load.

System modification sub-environment 328B includes industrial control application 330B and computing device 329B, which is running industrial control application 330B. Industrial control application 330B may be an application for building and/or editing industrial automation controller logic, such as ladder logic. In some examples, industrial control application 330B may also be utilized for building and/or editing HMI software for industrial automation processes. In this example, a user has accessed industrial control application 330B from computing device 329B and modified object A 310B in module A 304B. While the modifying user may have only intended to modify controller logic associated with module A 304B, object A 310B is also included in module B 306B. As such, module A 304B and module B 306B have been modified by the user's action in system modification sub-environment 328.

Industrial control application 330 has been used in split software module sub-environment 303B* to split individual controller software modules that were previously integrated as one navigable unit. That is, module B 306B* has been split from module A 304B* and module C 308B*, such that module B 306B* can be viewed as a separate navigable unit from module A 304B* and module C 308B*. A user may thus analyze, as a separate unit, module B 306B*, its corresponding controller logic, and any objects integrated therein that may have been affected by the modification made to module A 304B in system modification sub-environment 328B.

According to additional examples, a user may split a software module from a collaboratively rendered set of software modules, and modify the software module that was split from the collaborative set while it is a separate entity. In such examples, the remaining software modules that remain part of the set may maintain their autonomy while the software module that was split off is being modified.

The current disclosure provides technical advantages over prior solutions. For example, previously, when a modification was made to logic that affected multiple skid parts or modules provided by multiple vendors, the vendors would have to look at a single file and/or routine and attempt to determine which portions of the logic modifications were applicable to their skid/module hardware. However, according to the current invention and as illustrated by split software rendering sub-environment 303B, an application (e.g., industrial control application 330B) may split individual controller software modules that were previously integrated as one navigable unit, allowing users to easily determine which portions of those individual modules were affected, and/or to perform modifications to single software modules when they have been separated from sets of collaboratively rendered software modules. This provides vendors with the security of knowing that they can maintain autonomy over the software modules that correspond to their hardware once those modules have been integrated into a larger downstream process. Processing costs for breaking down code related to bugs in individual modules and/or diagnosing unintended effects of modifications to other modules is thus reduced by allowing each module to be split off and analyzed by the vendor that it pertains to.

Figure 4:
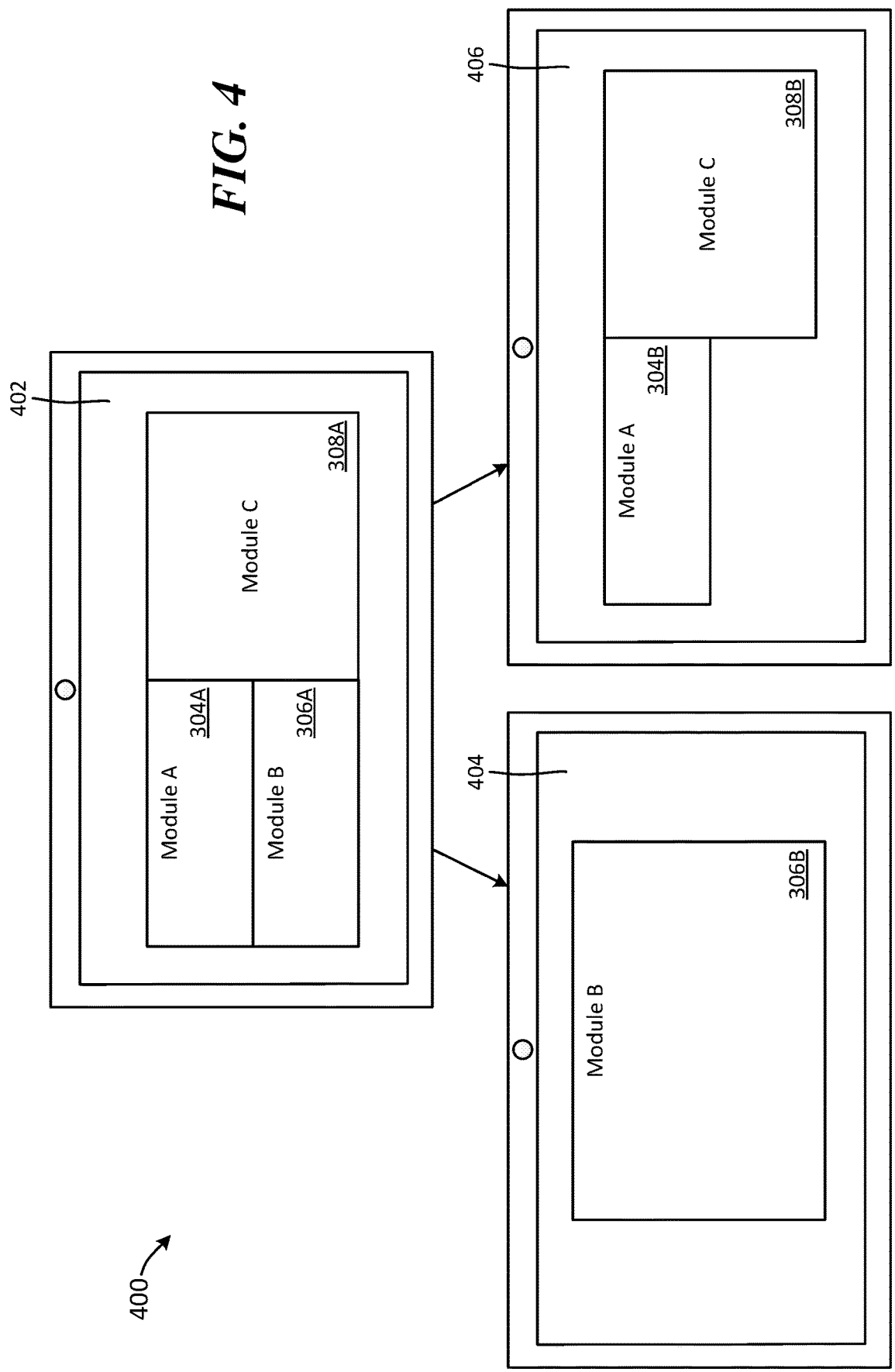
FIG. 4 illustrates the display of a plurality of exemplary industrial automation process modules rendered as a single integrated module and the display of those exemplary industrial automation process modules after one of the modules has been pulled out of the single integrated module.

FIG. 4 is an exemplary environment 400 that illustrates the display of a plurality of industrial automation process modules rendered as a single integrated module and the display of those exemplary industrial automation process modules after one of the modules has been pulled out of the single integrated module for viewing and editing as a separate entity. Environment 400 includes first user interface 402, second user interface 404, and third user interface 406. Those user interfaces are exemplary of user interfaces for an industrial controller logic application for viewing and editing controller logic associated with software modules for an industrial automation process. In some examples, each of module A 304A, module B 306A, and module C 308A, may represent industrial controller logic for individual skids for an integrated automated industrial process.

In this example, user interface 402 illustrates each of module A 304A, module B 306A, and module C 308A, as a single navigable unit. This integrated user interface may be preferable for the entity implementing the various modules in performing their automated process; however, vendors of the hardware corresponding to the individual modules may desire to be able to view the controller logic modules individually. For example, a vendor may wish to analyze the controller logic corresponding to its hardware in a distinct module to quickly and efficiently identify the modifications that have been made to its logic and/or objects incorporated in its logic. Thus, as illustrated by user interface 404 and user interface 406, module B 306B has been split off from the integrated modular unit, and is now separate from module A 304B, and module C 308B. Although not shown in FIG. 4, module A 304B and Module C 308B may also be separated from one another for separate analysis and editing according to mechanisms described herein.

Figure 5:
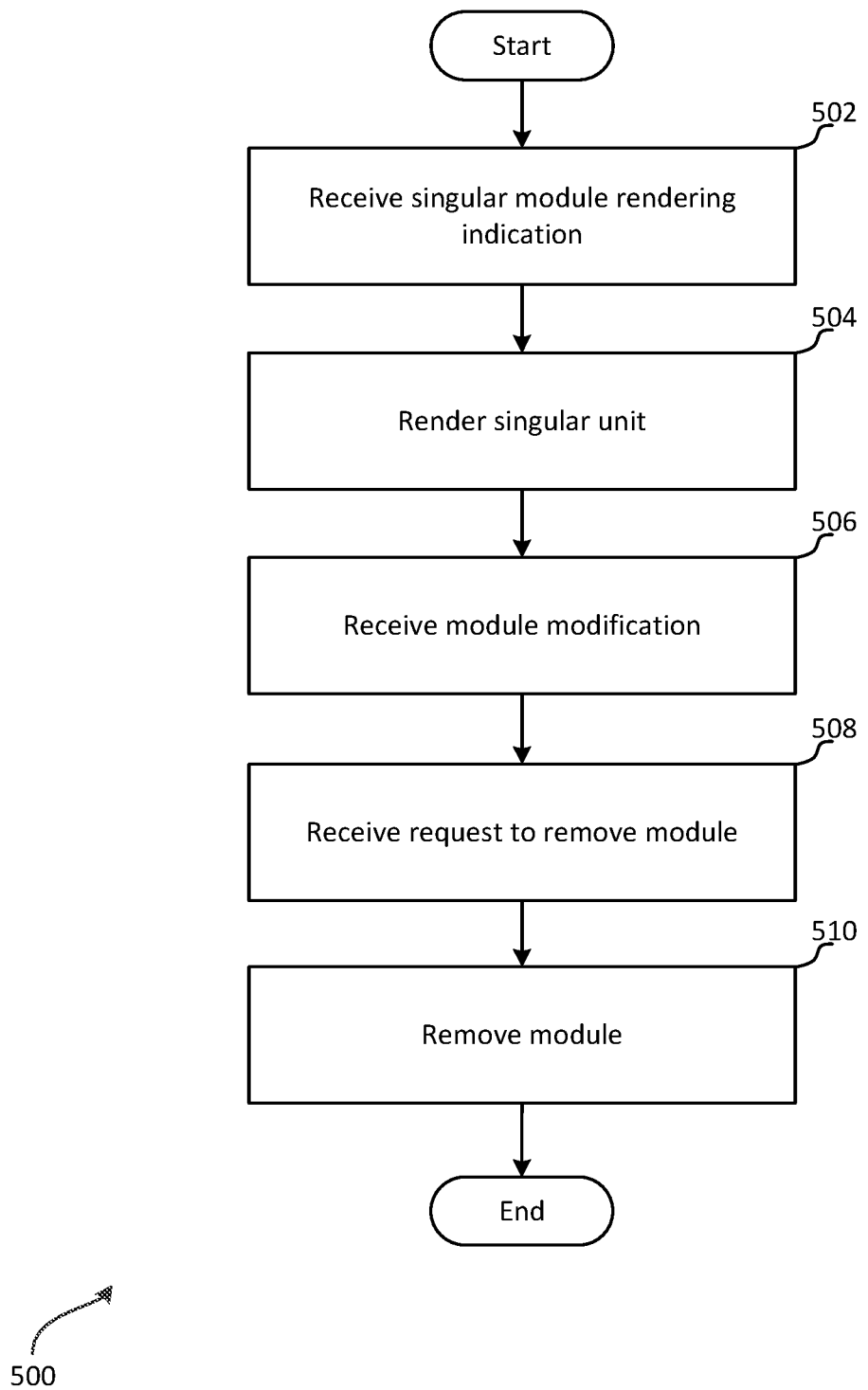
FIG. 5 illustrates an exemplary method for maintaining automated module autonomy across integrated design environments for industrial automation processes.

FIG. 5 illustrates an exemplary method 500 for maintaining automated module autonomy across integrated design environments for industrial automation processes. The method 500 begins at a start operation and flow moves to operation 502.

At operation 502 an indication to render a plurality of software modules for an automated industrial process into a module that is navigable as a singular unit is received. The indication may be received by an industrial controller application. For example, a user may setup a plurality of skids as part of one or more routines for an industrial automation process and an industrial controller application may be utilized to build, edit, and/or or incorporate pre-built ladder logic for each of the plurality of skids. The logic for each of the skids may correspond to one of the plurality of software modules, and a user of the industrial automation process may wish to view and/or edit the logic for the skids as a single unit because they all perform operations for a single routine of an automated process.

From operation 502 flow continues to operation 504 where the plurality of software modules are collectively rendered as a single module that is navigable as a singular unit. That is, the industrial controller application integrates each of the software modules into a single unit that can be viewed and edited. In some examples, the plurality of software modules are collectively rendered as a single ladder logic module that integrates each skid and the logic that connects each skid to each other skid. In other examples, the collectively rendered software modules may be navigable as a singular unit, but in order to make modifications to the logic, one or more software modules corresponding to the modification that is to be made may need to be split off from the collaboratively rendered set.

From operation 504 flow continues to operation 506 where a modification to a first one of the plurality of software modules that affects at least a second one of the plurality of software modules is received. The modification may be made via the controller application, and the modification may be to controller logic and/or an object incorporated in the controller logic of the first one of the plurality of software modules.

From operation 506 flow continues to operation 508 where a request to remove the second one of the plurality of software modules from the single module is received. The request may be made to remove logic specifically corresponding to the second software module that was affected by the modification to the first software module. The request may be made by, for example, a vendor or manufacturer of one or more hardware components corresponding to the second software module.

From operation 508 flow continues to operation 510 where the second one of the plurality of software modules is removed from the plurality of software modules. In some examples, a user that requested the removal of the second software module may request to view a location in the second one of the plurality of software modules that is affected by modification of the object in the first one of the plurality of software modules. For example, the user may wish to see whether an object corresponding to one of their hardware components was affected by the modification to the first software module. The requesting user may have superior know-how with regard to their own hardware components and the mechanisms by which logic corresponding to those hardware components are affected by modifications to logic that controls them. The location in code/logic corresponding to the location in the second software module affected by the modification in the first software module may be surfaced to the requesting user, and the user may utilize that information to diagnose bugs and/or other issues corresponding to the modification and the effects of that modification.

From operation 510 flow moves to an end operation and the method 500 ends.

Figure 6:
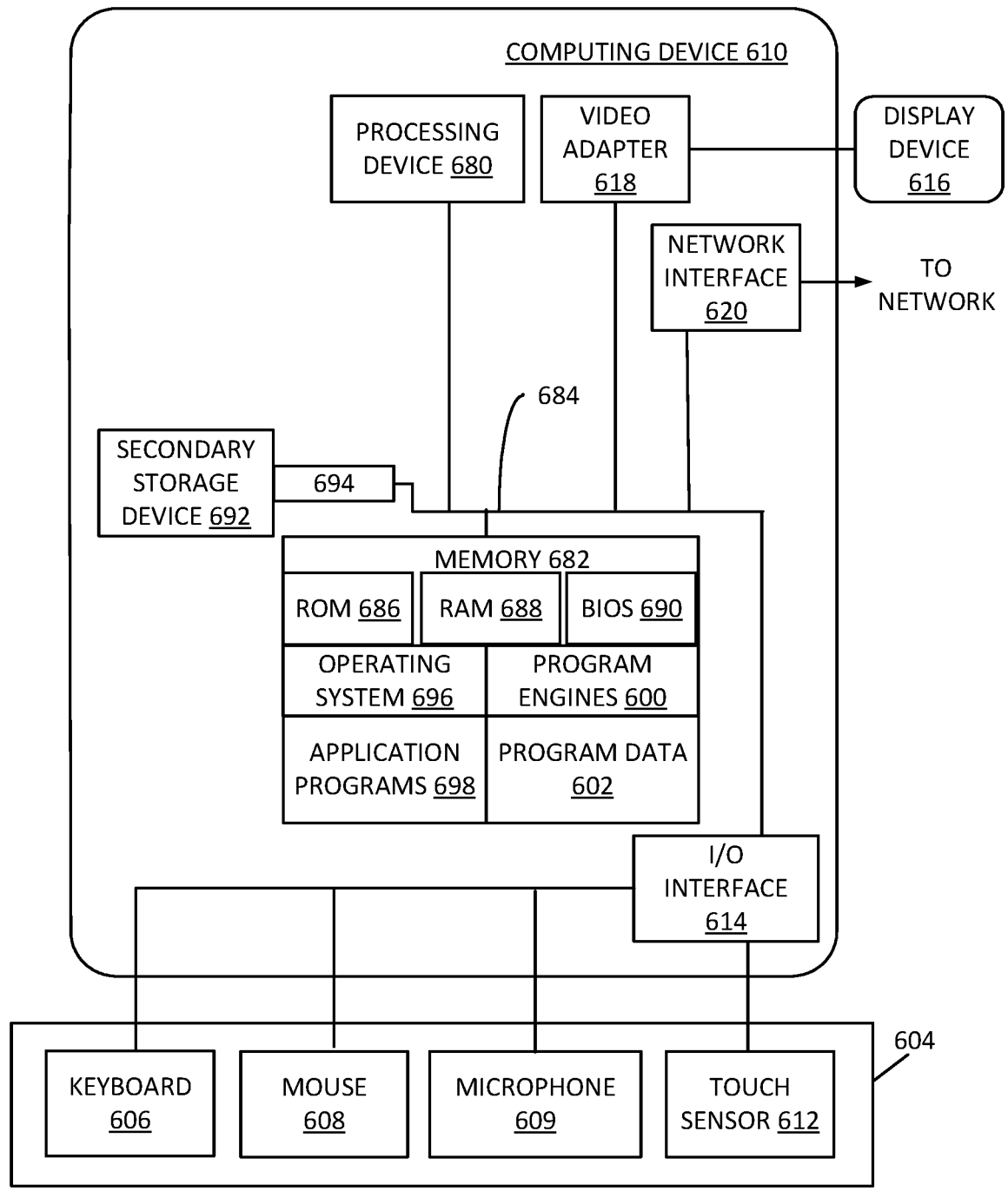
FIG. 6 is a block diagram illustrating example physical components of a computing device with which aspects of the disclosure may be practiced.

FIG. 6 illustrates one aspect in which an exemplary architecture of a computing device according to the disclosure that can be used to implement aspects of the present disclosure, including any of the plurality of computing devices described herein with reference to the various figures and their corresponding descriptions. The computing device illustrated in FIG. 6 can be used to execute the operating system, application programs, and software modules (including the software engines) described herein, for example, with respect to FIG. 7 and program engines 714, joint rendering engine 716, module splitting engine 718, test engine 720, collaboration engine 722, and location determination engine 724. By way of example, the computing device will be described below as the industrial automation computing device 610. To avoid undue repetition, this description of the computing device will not be separately repeated for each of the other computing devices described herein, but such devices can also be configured as illustrated and described with reference to FIG. 6.

The computing device 610 includes, in some embodiments, at least one processing device 680, such as a central processing unit (CPU). A variety of processing devices are available from a variety of manufacturers, for example, Intel, Advanced Micro Devices, and/or ARM microprocessors. In this example, the computing device 610 also includes a system memory 682, and a system bus 684 that couples various system components including the system memory 682 to the processing device 680. The system bus 684 is one of any number of types of bus structures including a memory bus, or memory controller; a peripheral bus; and a local bus using any of a variety of bus architectures.

Examples of computing devices suitable for the computing device 610 include a server computer, a programmable logic controller computer, a desktop computer, a laptop computer, a tablet computer, a mobile computing device (such as a smart phone, an iPod® or iPad® mobile digital device, or other mobile devices), or other devices configured to process digital instructions.

The system memory 682 includes read only memory 686 and random access memory 688. A basic input/output system 690 containing the basic routines that act to transfer information within computing device 610, such as during start up, is typically stored in the read only memory 686.

The computing device 610 also includes a secondary storage device 692 in some embodiments, such as a hard disk drive, for storing digital data. The secondary storage device 692 is connected to the system bus 684 by a secondary storage interface 694. The secondary storage devices 692 and their associated computer readable media provide nonvolatile storage of computer readable instructions (including application programs and program engines), data structures, and other data for the computing device 610. Details regarding the secondary storage devices 692 and their associated computer readable media, as well as their associated nonvolatile storage of computer readable instructions (including application programs and program engines) will be more fully described below with reference to FIG. 7.

Although the exemplary environment described herein employs a hard disk drive as a secondary storage device, other types of computer readable storage media are used in other aspects according to the disclosure. Examples of these other types of computer readable storage media include magnetic cassettes, flash memory cards, digital video disks, Bernoulli cartridges, compact disc read only memories, digital versatile disk read only memories, random access memories, or read only memories. Additional aspects may include non-transitory media. Additionally, such computer readable storage media can include local storage or cloud-based storage.

A number of program engines can be stored in secondary storage device 692 or memory 682, including an operating system 696, one or more application programs 698, other program engines 600 (such as the software engines described herein), and program data 602. The computing device 610 can utilize any suitable operating system, such as Linux, Microsoft Windows™, Google Chrome™, Apple OS, and any other operating system suitable for a computing device.

According to examples, a user provides inputs to the computing device 610 through one or more input devices 604. Examples of input devices 604 include a keyboard 606, mouse 608, microphone 609, and touch sensor 612 (such as a touchpad or touch sensitive display). Additional examples may include other input devices 604. The input devices are often connected to the processing device 680 through an input/output interface 614 that is coupled to the system bus 684. These input devices 604 can be connected by any number of input/output interfaces, such as a parallel port, serial port, game port, or a universal serial bus. Wireless communication between input devices and the interface 614 is possible as well, and includes infrared, BLUETOOTH® wireless technology, cellular and other radio frequency communication systems in some possible aspects.

In an exemplary aspect, a display device 616, such as a monitor, liquid crystal display device, projector, or touch sensitive display device, is also connected to the system bus 684 via an interface, such as a video adapter 618. In addition to the display device 616, the computing device 610 can include various other peripheral devices (not shown), such as speakers or a printer.

When used in a local area networking environment or a wide area networking environment (such as the Internet), the computing device 610 is typically connected to a network through a network interface 620, such as an Ethernet interface. Other possible embodiments use other communication devices. For example, certain aspects of the computing device 610 may include a modem for communicating across the network.

The computing device 610 typically includes at least some form of computer readable media. Computer readable media includes any available media that can be accessed by the computing device 610. By way of example, computer readable media include computer readable storage media and computer readable communication media.

Computer readable storage media includes volatile and nonvolatile, removable and non-removable media implemented in any device configured to store information such as computer readable instructions, data structures, program engines or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 610. Computer readable storage media does not include computer readable communication media.

Computer readable communication media typically embodies computer readable instructions, data structures, program engines or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 6 is also an example of programmable electronics, which may include one or more such computing devices, and when multiple computing devices are included, such computing devices can be coupled together with a suitable data communication network so as to collectively perform the various functions, methods, or operations disclosed herein.

Figure 7:
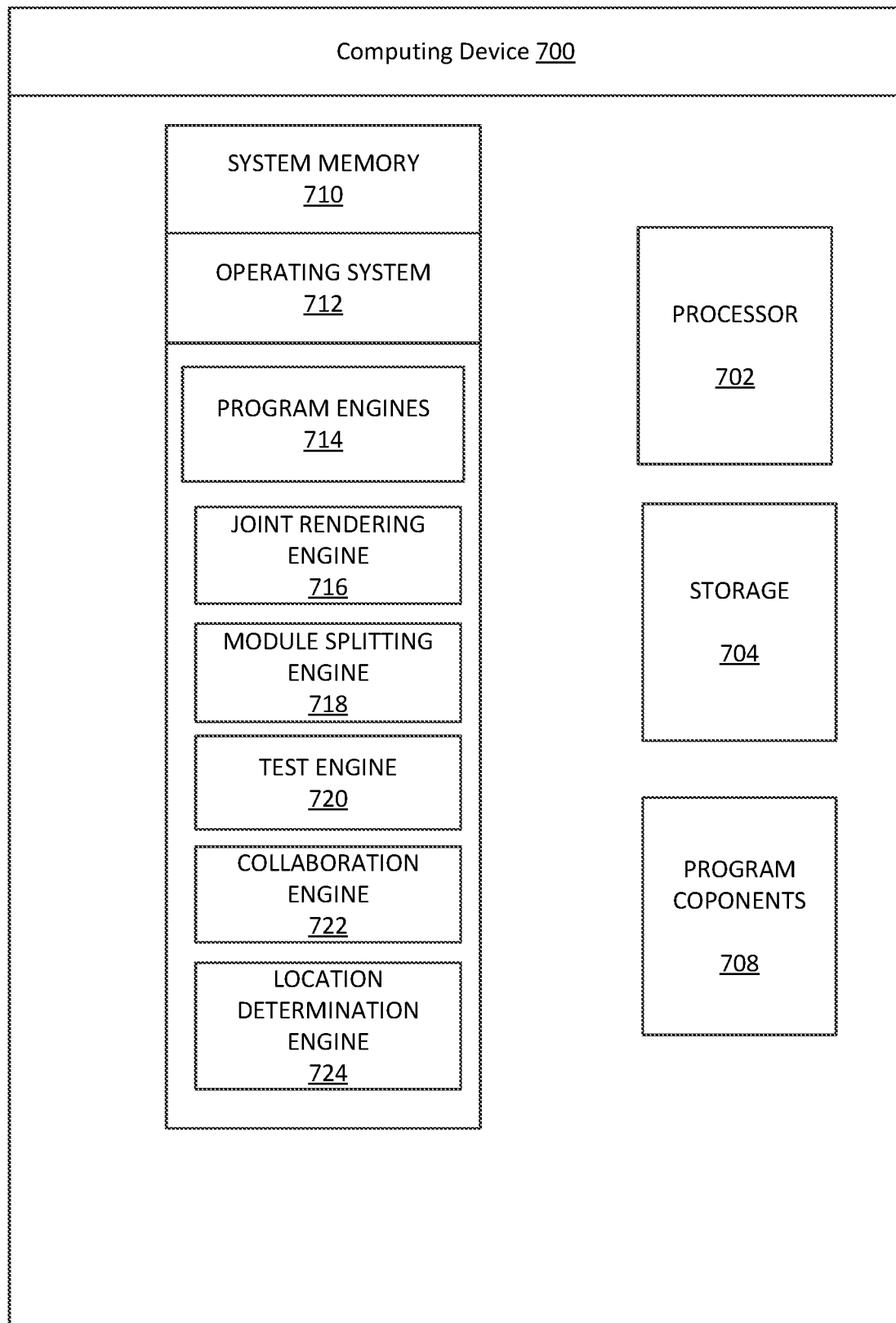
FIG. 7 is a block diagram illustrating physical components (e.g., hardware) of a computing device with which aspects of the disclosure may be practiced.

FIG. 7 is a block diagram illustrating additional physical components (e.g., hardware) of a computing device 700 with which certain aspects of the disclosure may be practiced. The computing device components described below may have computer executable instructions for: receiving an indication to render a plurality of software modules for an automated industrial process into a module that is navigable as a singular unit; rendering the plurality of software modules as a single module that is navigable as a singular unit; receiving a modification to a first one of the plurality of software modules that affects at least a second one of the plurality of software modules; receiving a request to remove the second one of the plurality of software modules from the single module; and removing the second one of the plurality of software modules from the single module. Computing device 700 may perform these functions alone or in combination with a distributed computing network one or more additional computing devices which may communicate and process the one or more of the program engines in FIG. 7 including joint rendering engine 716, which may perform one or more operations associated with rendering a plurality of software modules corresponding to hardware components of an automated routine/process as a singular navigable unit; module splitting engine 718, which may perform one or more operations associated with splitting at least one software module off from a collaboratively rendered software module unit; test engine 720, which may perform one or more operations associated with testing ladder logic via one or more virtual industrial controllers; collaboration engine 722, which may perform one or more operations associated with allowing users to communicate and leave notes for one another in the development of industrial automation projects; and location determination engine 724, which may perform one or more operations associated with identifying a location in a software module that has been affected by a modification to a first software module.

In a basic configuration, the computing device 700 may include at least one processor 702 and a system memory 710. Depending on the configuration and type of computing device, the system memory 710 may comprise, but is not limited to, volatile storage (e.g., random access memory), non-volatile storage (e.g., read-only memory), flash memory, or any combination of such memories. The system memory 710 may include an operating system 712 and one or more program engines 714 suitable for assisting with maintain automated process module autonomy across integrated design environments, such as one or more components in regards to FIG. 6 and, in particular, joint rendering engine 716, module splitting engine 718, test engine 720, collaboration engine 722, and location determination engine 724. The operating system 712, for example, may be suitable for controlling the operation of the computing device 700. Furthermore, aspects of the disclosure may be practiced in conjunction with a graphics library, other operating systems, or any other application program and is not limited to any particular application or system.

The computing device 700 may have additional features or functionality. For example, the computing device 700 may also include additional data storage device (removable and/or non-removable) such as, for example, magnetic disks, optical disks, or tape. Such additional storage is illustrated in FIG. 7 by storage 704. It will be well understood by those of skill in the art that storage may also occur via distributed computing networks, which are not shown in FIG. 7.

As stated above, a number of program engines and data files may be stored in the system memory 710. While executing the processor 702, the program engines 714 (e.g., joint rendering engine 716, module splitting engine 718, test engine 720, collaboration engine 722, and location determination engine 724) may perform processes including, but not limited to, the aspects described herein.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A non-transitory computer-readable medium having stored thereon instructions that, in response to execution, cause a system comprising a processor to perform operations, the operations comprising:
   in response to receiving an indication to render a plurality of software modules for an automated industrial process, collectively rendering and displaying each of the plurality of software modules as a combined module comprising logic for each of the plurality of software modules that is navigable, viewable, and editable as a singular unit, wherein the collective rendering and displaying maintains the autonomy of each of the plurality of software modules to be split from the combined module; and
   in response to receiving a request to independently view a software module of the plurality of software modules:
      splitting the software module from the combined module; and
      rendering and displaying the software module comprising logic for the software module that is navigable, viewable, and editable as an independent entity from the combined module.

2. The non-transitory computer-readable medium of claim 1, the operations further comprising:
   receiving a request to independently modify the software module, wherein the modification of the software module in the combined module alters at least one other of the plurality of software modules in the combined module; and
   in response to the request, modifying the software module as the independent entity, wherein the modification of the software module as the independent entity does not affect the at least one other of the plurality of software modules.

3. The non-transitory computer-readable medium of claim 2, wherein modifying the software module comprises a modification to a software automation object.

4. The non-transitory computer-readable medium of claim 3, wherein the software automation object is a shared object in a shared object library.

5. The non-transitory computer-readable medium of claim 4, wherein the shared object library comprises a plurality of software objects having corresponding physical parts in the automated industrial process.

6. The non-transitory computer-readable medium of claim 5, wherein each of the software objects in the shared object library has at least one property that an automated control device can be programmed to act on, and wherein each of the plurality of software objects has at least one property that a human machine interface component can utilize in generating an element corresponding to the software object for display on a human machine interface.

7. The non-transitory computer-readable medium of claim 2, wherein the operations further comprise, subsequent to modifying the software module and in response to receiving an input to re-render the plurality of software modules, re-rendering the plurality of software modules as the combined module comprising modified logic for the software module.

8. A system for assisting with maintaining automated process module autonomy across integrated design environments, comprising:
   a memory that stores executable program code; and
   a processor functionally coupled to the memory, the processor being responsive to executable instructions contained in the program code and operative to:
   in response to receiving an indication to render a plurality of software modules for an automated industrial process, collectively render and display each of the plurality of software modules as a single module comprising logic for each of the plurality of software modules that is navigable, viewable, and editable as a singular unit, wherein the collective rendering and displaying maintains the autonomy of each of the plurality of software modules to be split from the single module; and
   in response to receiving a request to independently view a software module of the plurality of software modules:
      split the software module from the single module; and
      render and display the software module comprising logic for the software module that is navigable, viewable, and editable as an independent entity from the single module.

9. The system of claim 8, wherein the processor is further responsive to the executable instructions contained in the program code and operative to:
   receive a request to independently modify the software module, wherein the modification of the software module in the single module alters at least one other of the plurality of software modules in the single module; and in response to the request, modify the software module as the independent entity, wherein the modification of the software module as the independent entity does not affect the at least one other of the plurality of software modules.

10. The system of claim 9, wherein the modification to the software module is one of: removal of an object from the software module; addition of the object to the software module; or modification of the object from the software module.

11. The system of claim 8, wherein the plurality of software modules are skid software modules.

12. The system of claim 8, wherein the processor is further responsive to the executable instructions contained in the program code and operative to:

in response to a request to modify a second software module of the plurality of software modules, modify the second software module in the single module, wherein the modification of the second software module in the single module alters a third software module in the single module; and in response to receiving a request to view a location in the third software module is affected by the modification of the second software module, enable display of the location in the third software module.

13. The system of claim 12, wherein the modification to the second software module is a modification to an object in the second software module.

14. The system of claim 13, wherein the location in the third software module comprises a same object as the object.

15. A method for assisting with maintaining automated process module autonomy across integrated design environments, comprising:

in response to receiving an indication to render a plurality of software modules for an automated industrial process, collectively rendering and displaying each of the plurality of software modules as a single module comprising logic for each of the plurality of software modules that is navigable, viewable, and editable as a singular unit, wherein the collective rendering and displaying maintains the autonomy of each of the plurality of software modules to be split from the single module; and in response to receiving a request to independently view a software module of the plurality of software modules:
splitting the software module from the single module; and
rendering and displaying the software module comprising logic for the software module that is navigable, viewable, and editable as an independent entity from the single module.

16. The method of claim 15, wherein the plurality of software modules are skid software modules.

17. The method of claim 15, further comprising:

in response to a request to modify a second software module of the plurality of software modules, modify the second software module in a single module, wherein the modification of the second software module in the single module alters a third software module in the single module, and wherein the modification to the second software module is a modification to an object in the second software module.

18. The method of claim 17, further comprising:

in response to receiving a request to view a location in the third software module enabling display of the location in the third software module.

19. The method of claim 17, wherein the object that is modified in the second software module is integrated in controller logic for the automated industrial process.

20. The method of claim 17, further comprising:

subsequent to the modification to the second software module and in response to receiving an indication to re-render the plurality of software modules, collectively re-rendering and displaying each of the plurality of software modules as the single module comprising modified logic for the second software module.

* * * * *